United States Patent
Abe et al.

(10) Patent No.: US 7,629,085 B2
(45) Date of Patent: Dec. 8, 2009

(54) NONAQUEOUS ELECTROLYTIC SOLUTION AND LITHIUM SECONDARY BATTERY

(75) Inventors: Koji Abe, Yamaguchi (JP); Kazuhiro Miyoshi, Yamaguchi (JP); Takaaki Kuwata, Yamaguchi (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 88 days.

(21) Appl. No.: 11/597,652

(22) PCT Filed: May 30, 2005

(86) PCT No.: PCT/JP2005/009900

§ 371 (c)(1),
(2), (4) Date: Nov. 27, 2006

(87) PCT Pub. No.: WO2005/117197

PCT Pub. Date: Dec. 8, 2005

(65) Prior Publication Data

US 2007/0231707 A1 Oct. 4, 2007

(30) Foreign Application Priority Data

May 28, 2004 (JP) .............................. 2004-159283

(51) Int. Cl.
*H01M 10/40* (2006.01)
*H01M 6/16* (2006.01)
(52) U.S. Cl. ...................... 429/340; 429/188; 429/326; 429/306; 429/307; 429/324; 429/333
(58) Field of Classification Search .................. 429/340
See application file for complete search history.

(56) References Cited

U.S. PATENT DOCUMENTS

| | | | |
|---|---|---|---|
| 6,033,809 A | | 3/2000 | Hamamoto et al. |
| 6,479,191 B1 * | | 11/2002 | Hamamoto et al. ......... 429/326 |

FOREIGN PATENT DOCUMENTS

| | | |
|---|---|---|
| JP | 06-223875 | 8/1994 |
| JP | 11-121032 | 4/1999 |
| JP | 11-339850 | 12/1999 |
| JP | 2000-195545 | 7/2000 |
| JP | 2001-043895 | 2/2001 |
| JP | 2002-100399 | 4/2002 |
| JP | 2002-110234 | 4/2002 |
| JP | 2002-124297 | 4/2002 |
| JP | 2002-134169 | 5/2002 |
| JP | 2002-198092 | 7/2002 |
| JP | 2003-132946 | 5/2003 |
| JP | 2004-265848 | 9/2004 |
| JP | 2005-190754 | 7/2005 |

OTHER PUBLICATIONS

International Search Report for PCT/JP2005/009900 dated Aug. 30, 2005, 2 pages.

* cited by examiner

*Primary Examiner*—Patrick Ryan
*Assistant Examiner*—Angela J. Martin
(74) *Attorney, Agent, or Firm*—Nixon Peabody LLP; Jeffrey L. Costellia

(57) ABSTRACT

A nonaqueous electrolytic solution for a lithium secondary battery, in which 0.01 to 10 wt. % of a sulfur-containing acid ester and 0.01 to 10 wt. % of a triple bond-containing compound are dissolved in a nonaqueous solvent, and a lithium secondary battery employing the nonaqueous electrolytic solution.

8 Claims, No Drawings

NONAQUEOUS ELECTROLYTIC SOLUTION AND LITHIUM SECONDARY BATTERY

FIELD OF INVENTION

The present invention relates to a nonaqueous electrolytic solution employable for manufacturing a lithium secondary battery having excellent battery characteristics in cycle performance, electric capacity and storage property. The invention also relates to a lithium secondary battery employing the nonaqueous electrolytic solution.

BACKGROUND OF INVENTION

Recently, a lithium secondary battery is generally employed as an electric source for driving small electronic devices. The lithium secondary battery essentially comprises a positive electrode, a nonaqueous electrolytic solution, and a negative electrode. A lithium secondary battery utilizing a positive electrode of lithium compound oxide such as $LiCoO_2$ and a negative electrode of carbonaceous material or lithium metal is favorably employed. As the electrolytic solution for the lithium secondary battery, a carbonate such as ethylene carbonate (EC) or propylene carbonate (PC) is generally used.

DISCLOSURE OF INVENTION

Problems to be Solved by Invention

Although the known lithium secondary batteries can satisfy basic requirements, it is nevertheless desired to provide a secondary battery showing improved characteristics in cycle performance and electric capacity.

A lithium secondary battery utilizing a positive electrode of $LiCoO_2$, $LiMn_2O_4$ or $LiNiO_2$ sometimes shows decrease of electric performances because a portion of the nonaqueous solvent in the nonaqueous electrolytic solution oxidatively decomposes in the course of charging and hence the produced decomposition product disturbs the desired electrochemical reaction. The decomposition is considered to be caused by electrochemical oxidation of the solvent on the interface between the positive electrode and the nonaqueous electrolytic solution.

The lithium secondary battery utilizing a negative electrode of carbonaceous material of high crystallization such as natural graphite or artificial graphite also shows decrease of electric performances because a solvent of the electrolytic solution reductively decomposes on the surface of the negative electrode in the course of charging. The reductive decomposition also occurs in the repeated charging-discharging procedures.

In order to improve performances (particularly, cycle performance) of a lithium secondary battery, Patent Publication 1 describes that 1,3-propanesultone is preferably contained in an amount of preferably 0.1 to 9 wt. % in a non-aqueous solvent.

For the same purpose, Patent Publication 2 describes that glycol sulfite is preferably contained in an amount of preferably 0.05 to 99.99 vol. % in a non-aqueous solvent.

Patent Publication 3 also describes that a sultone compound is incorporated into a nonaqueous electrolytic solution of a lithium secondary battery.

Further, in Patent Publications 4 to 8, it is described that a triple bond-containing compound is incorporated into a nonaqueous electrolytic solution of a lithium secondary battery.

In order to improve electric capacity of a lithium secondary battery, it has also been studied to increase density of the positive or negative electrode composite layer. It is found, however, that, if the positive electrode composite layer is densely (for example, in the density of 3.2 to 4.0 $g/cm^3$) formed on the aluminum foil or if the negative electrode composition layer is densely (for example, in the density of 1.0 to 2.0 $g/cm^3$) formed on the copper foil, the electrolytic solution gradually decreases to dry out (to diminish) in the repeated charging-discharging procedures and, as a result, the cycle lifetime shortens.

Patent Publication 1: JP-A-11-339850
Patent Publication 2: JP-A-11-121032
Patent Publication 3: JP-A-2000-3724
(U.S. Pat. No. 6,033,809)
Patent Publication 4: JP-A-2000-195545
(U.S. Pat. No. 6,479,191)
Patent Publication 5: JP-A-2001-43895
Patent Publication 6: JP-A-2001-313072
(U.S. Pat. No. 6,479,191)
Patent Publication 7: JP-A-2002-100399
Patent Publication 8: JP-A-2002-124297

Means to Solve Problems

The present invention has an object to solve the above problems on the nonaqueous electrolytic solution for a lithium secondary battery and thereby to provide a nonaqueous electrolytic solution employable for manufacturing a lithium secondary battery of improved battery cycle performance, of improved electric capacity and of improved storage property in the charged condition. The present invention resides in a nonaqueous electrolytic solution for a lithium secondary battery, comprising an electrolytic salt dissolved in a nonaqueous solvent, characterized by containing 0.01 to 10 wt. of a sulfur-containing acid ester and 0.01 to 10 wt. % of a triple band-containing compound.

The invention also resides in a lithium secondary battery comprising a positive electrode, a negative electrode and a nonaqueous electrolytic solution, wherein the electrolytic solution is the above-mentioned electrolytic solution of the invention.

The nonaqueous electrolytic solution of the invention is advantageously used for a lithium secondary battery in which the positive electrode comprises a material containing lithium compound oxide and in which the negative electrode comprises a material capable of absorbing and releasing lithium ions.

Effect of Invention

A lithium secondary battery employing the nonaqueous electrolytic solution of the invention is excellent in battery performances such as cycle performance, electric capacity and storage property.

Best Embodiment of Invention

It has been revealed that, if specific amounts of a sulfur-containing acid ester and a triple bond-containing compound are incorporated into a nonaqueous electrolytic solution of a lithium secondary battery having high capacity, the electrolytic solution is prevented from drying out and the resultant battery shows excellent cycle performance. The mechanism of this effect is not clear, but it is thought that the sulfur-containing acid ester and the triple bond-containing compound react with each other to form a strong surface film on the negative electrode.

Representative examples of the sulfur-containing acid ester are cyclic sulfur-containing acid esters, but non-cyclic sulfur-containing acid esters are also employable. The cyclic sulfur-containing acid esters are, for example, sultones, cyclic sulfites and cyclic sulfates. Sultones and cyclic sulfites are preferred. The non-cyclic sulfur-containing acid esters are, for example, non-cyclic sulfites, non-cyclic sulfates, disulfonates and trisulfonates. Non-cyclic sulfites and disulfonates are preferred.

Examples of the sultones include 1,3-propane sultone, 1,3-butane sultone, 1,4-butane sultone and 1,3-propene sultone. Particularly preferred is 1,3-propane sultone.

Examples of the cyclic sulfites include glycol sulfite, propylene sulfite, butylene sulfite, vinylene sulfite and catechol sulfite. Particularly preferred is glycol sulfite.

Examples of the non-cyclic sulfites include dimethyl sulfite, diethyl sulfite, dipropyl sulfite, dibutyl sulfite, dipentyl sulfite, dihexyl sulfite, diheptyl sulfite, dioctyl sulfite and diallyl sulfite.

Examples of the cyclic sulfates include glycol sulfate, propylene sulfate, vinylene sulfate and catechol sulfate. Preferred is glycol sulfate.

Examples of the non-cyclic sulfates include dimethyl sulfate, diethyl sulfate, dipropyl sulfate, dibutyl sulfate, dipentyl sulfate, dihexyl sulfate, diheptyl sulfate, dioctyl sulfate and diallyl sulfate.

Examples of the disulfonates include ethyleneglycol dimethanesulfonate, 1,2-propanediol dimethanesulfonate, 1,3-propanediol dimethanesulfonate, 1,3-butanediol dimethanesulfonate, 1,4-butanediol dimethanesulfonate, 2,3-butanediol dimethanesulfonate, 1,5-pentanediol dimethanesulfonate, 1,6-hexanediol dimethanesulfonate, 1,7-heptanediol dimethanesulfonate, and 1,8-octanediol dimethanesulfonate. Preferred are 1,3-propanediol dimethanesulfonate and 1,4-butanediol dimethanesulfonate, and more preferred is 1,4-butanediol dimethanesulfonate.

Examples of the trisulfonates include glycerol trimethanesulfonate, 1,2,4-butanetriol trimethanesulfonate, and 1,3,5-pentatriol trimethanesulfonate. Preferred is 1,2,4-butanetriol trimethanesulfonate.

The sulfur-containing acid ester is preferably at least one compound selected from the group consisting of 1,3-propane sultone, 1,3-butane sultone, glycol sulfite, propylene sulfite, glycol sulfate, propylene sulfate, 1,3-propanediol dimethanesulfonate and 1,4-butanediol dimethanesulfonate. Nonaqueous electrolytic solutions containing the above-mentioned sulfur-containing acid esters improve battery performances such as cycle performance, electric capacity and storage property. It is particularly preferred for the nonaqueous electrolytic solution to contain at least one compound selected from the group consisting of 1,3-propane sultone, glycol sulfite, glycol sulfate and 1,4-butanediol dimethanesulfonate.

The amount of the sulfur-containing acid ester preferably is not less than 0.01 wt. %, more preferably not less than 0.05 wt. %, most preferably not less than 0.1 wt. %, based on the weight of the nonaqueous electrolytic solution. At the same time, the amount of sulfur-containing acid ester preferably is not more than 10 wt. %, more preferably not more than 5 wt. %, based on the weight of the solution. If the amount is too large, the battery performances are often impaired. If the amount is too small, the battery performances cannot be satisfactorily improved.

In the invention, the sulfur-containing acid ester is used in combination with a triple bond-containing compound. The triple bond-containing compound preferably is an alkyne derivative represented by one of the following formulas (I), (II), (III), (IV), (V) and (VI):

(I)

(II)

(III)

(IV)

(V)

(VI)

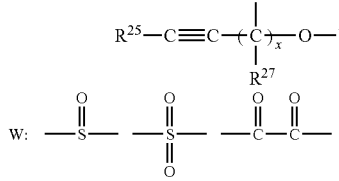

in which $R^1$ is an alkyl group having 1 to 12 carbon atoms, a cycloalkyl group having 3 to 6 carbon atoms or an aryl group; $R^2$ is an alkyl group having 1 to 12 carbon atoms, a cycloalkyl group having 3 to 6 carbon atoms, an aryl group or hydrogen; p is an integer of 1 or 2; each of $R^3$ to $R^{19}$ is independently an alkyl group having 1 to 12 carbon atoms, a cycloalkyl group having 3 to 6 carbon atoms, an aryl group or hydrogen, provided that each set of $R^4$ and $R^5$, $R^6$ and $R^7$, $R^8$ and $R^9$, $R^{10}$ and $R^{11}$, $R^{12}$ and $R^{13}$, $R^{15}$ and $R^{16}$ and $R^{17}$ and $R^{18}$ may combine with each other to form a cycloalkyl group having 3 to 6 carbon atoms; $Y^1$ is —COOR$^{20}$, —COR$^{20}$ or —SO$_2$R$^{20}$; $Y^2$ is —COOR$^{21}$, —COR$^{21}$ or —SO$_2$R$^{21}$; $Y^3$ is —COOR$^{22}$, —COR$^{22}$ or —SO$_2$R$^{22}$; $Y^4$ is —COOR$^{23}$, —COR$^{23}$ or —SO$_2$R$^{23}$; $Y^5$ is —COOR$^{24}$, —COR$^{24}$ or —SO$_2$R$^{24}$; each of $R^{20}$, $R^{21}$, $R^{22}$, $R^{23}$ and $R^{24}$ is independently an alkyl group having 1 to 12 carbon atoms, a cycloalkyl group having 3 to 6 carbon atoms or an aryl group; each of $R^{25}$, $R^{26}$ and $R^{27}$ is independently an alkyl group having 1 to 12 carbon atoms, a cycloalkyl group having 3 to 6 carbon atoms, an aryl group having 6 to 12 carbon atoms, an aralkyl group having 7 to 12 carbon atoms or hydrogen, provided that $R^{26}$ and $R^{27}$ may combine with each other to form a cycloalkyl group having 3 to 6 carbon atoms; W is sulfoxide, sulfone or oxalyl; $Y^6$ is an alkyl group having 1 to 12 carbon atoms, an alkenyl group, alkynyl group, a cycloalkyl group having 3 to 6 carbon atoms, an aryl group having 6 to 12 carbon atoms or an aralkyl group having 7 to 12 carbon atoms; and x is an integer of 1 or 2.

Examples of the triple bond-containing compounds represented by the formula (I) include: 2-pentyne [$R^1$: methyl, $R^2$: ethyl, p=1], 1-hexyne [$R^1$: butyl, $R^2$: hydrogen, p=1], 2-hexyne [R¹: propyl, R²: methyl, p=1], 3-hexyne [R¹: ethyl, R²: ethyl, p=1], 1-heptyne [R¹: pentyl, R²: hydrogen, p=1], 1-octyne [R¹: hexyl, R²: hydrogen, p=1], 2-octyne [R¹: methyl, R²: pentyl, p=1], 4-octyne [R¹: propyl, R²: propyl, p=1], 1-decyne [R¹: octyl, R²: hydrogen, p=1], 1-dodecyne [R¹: decyl, R²: hydrogen, p=1], phenylacetylene [R¹: phenyl, R²: hydrogen, p=1], 1-phenyl-1-propyne [R¹: phenyl, R²: methyl, p=1], 1-phenyl-1-butyne [R¹: phenyl, R²: ethyl, p=1], 1-phenyl-1-pentyne [R¹: phenyl, R²: propyl, p=1], 1-phenyl-1-hexyne [R¹: phenyl, R²: butyl, p=1], diphenylacetylene [R¹: phenyl, R²: phenyl, p=1], 4-ethynyltoluene [R¹: p-tolyl, R²: hydrogen, p=1], 4-tert-butylphenylacetylene [R¹: 4-tert-butylphenyl, R²: hydrogen, p=1], 1-ethynyl-4-fluorobenzene [R¹: p-fluorophenyl, R²: hydrogen, p=1], 1,4-diethynylbenzene [R¹: p-ethynylphenyl, R²: hydrogen, p=1], dicyclohexylacetylene [R¹: cyclohexyl, R²: cyclohexyl, p=1], and 1,4-diphenylbutadiene [R¹: phenyl, R²: phenyl, p=2].

Examples of the triple bond-containing compounds represented by the formula (II) in the case where Y¹ is —COOR²⁰ include: 2-propynyl methyl carbonate [R³: hydrogen, R⁴: hydrogen, R⁵: hydrogen, R²⁰: methyl, x=1], 1-methyl-2-propynyl methyl carbonate [R³: hydrogen, R⁴: methyl, R⁵: hydrogen, R²⁰: methyl, x=1], 2-propynyl ethyl carbonate [R³: hydrogen, R⁴: hydrogen, R⁵: hydrogen, R²⁰: ethyl, x=1], 2-propynyl propyl carbonate [R³: hydrogen, R⁴: hydrogen, R⁵: hydrogen, R²⁰: phenyl, x=1], 2-propynyl butyl carbonate [R³: hydrogen, R⁴: hydrogen, R⁵: hydrogen, R²⁰: butyl, x=1], 2-propynyl phenyl carbonate [R³: hydrogen, R⁴: hydrogen, R⁵: hydrogen, R²⁰: phenyl, x=1], 2-propynyl cyclohexyl carbonate [R³: hydrogen, R⁴: hydrogen, R⁵: hydrogen, R²⁰: cyclohexyl, x=1], 2-butynyl methyl carbonate [R³: methyl, R⁴: hydrogen, R⁵: hydrogen, R²⁰: methyl, x=1], 3-butynyl methyl carbonate [R³: hydrogen, R⁴: hydrogen, R⁵: hydrogen, R²⁰: methyl, x=2], 2-pentynyl methyl carbonate [R³: ethyl, R⁴: hydrogen, R⁵: hydrogen, R²⁰: methyl, x=1], 1-methyl-2-butynyl methyl carbonate [R³: methyl, R⁴: methyl, R⁵: hydrogen, R²⁰: methyl, x=1], 1,1-dimethyl-2-propynyl methyl carbonate [R³: hydrogen, R⁴: methyl, R⁵: methyl, R²⁰: methyl, x=1], 1,1-diethyl-2-propynyl methyl carbonate [R³: hydrogen, R⁴: ethyl, R⁵: ethyl, R²⁰: methyl, x=1], 1,1-ethylmethyl-2-propynyl methyl carbonate [R³: hydrogen, R⁴: ethyl, R⁵: methyl, R²⁰: methyl, x=], 1,1-isobutylmethyl-2-propynyl methyl carbonate [R³: hydrogen, R⁴: isobutyl, R⁵: methyl, R²⁰: methyl, x=1], 1,1-dimethyl-2-butynyl methyl carbonate [R³: methyl, R⁴ methyl, R⁵: methyl, R²⁰: methyl, x=1], 1-ethynylcyclohexyl methyl carbonate [R³: hydrogen, R⁴ and R⁵ are combined to form pentamethylene, R²⁰: methyl, x=1], 1,1-phenylmethyl-2-propynyl methyl carbonate [R³: hydrogen, R⁴: phenyl, R⁵: methyl, R²⁰: methyl, x=1], 1,1-di-phenyl-2-propynyl methyl carbonate [R³: hydrogen, R⁴: phenyl, R⁵: phenyl, R²⁰: methyl, x=1], and 1,1-dimethyl-2-propynyl ethyl carbonate [R³: hydrogen, R⁴: methyl, R⁵: methyl, R²⁰: ethyl, x=1].

Examples of the triple bond-containing compounds represented by the formula (II) in the case where Y¹ is —COR²⁰ include: 2-propynyl formate [R³: hydrogen, R⁴: hydrogen, R⁵: hydrogen, R²⁰: hydrogen, x=1], 1-methyl-2-propynyl formate [R³: hydrogen, R⁴: methyl, R⁵: hydrogen, R²⁰: hydrogen, x=1], 2-propynyl acetate [R³: hydrogen, R⁴: hydrogen, R⁵: hydrogen, R²⁰; methyl, x=1], 1-methyl-2-propynyl acetate [R³: hydrogen, R⁴; methyl, R⁵: hydrogen, R²⁰; methyl, x=1], 2-propynyl propionate [R³: hydrogen, R⁴: hydrogen, R⁵: hydrogen, R²⁰: ethyl, x=1], 2-propynyl butyrate [R³: hydrogen, R⁴: hydrogen, R⁵: hydrogen, R²⁰: propyl, x=1], 2-propynyl benzoate [R³: hydrogen, R⁴: hydrogen, R⁵: hydrogen, R²⁰: phenyl, x=1], 2-propynyl cyclohexyl carboxylate [R³: hydrogen, R⁴: hydrogen, R⁵: hydrogen, R²⁰: cyclohexyl, x=1], 2-butynyl formate [R³: methyl, R⁴: hydrogen, R⁵; hydrogen, 10: hydrogen, x=1], 3-butynyl formate [R³: hydrogen, R⁴: hydrogen, R⁵: hydrogen, R²⁰: hydrogen, x=2], 2-pentynyl formate [R³: ethyl, R⁴: hydrogen, R⁵: hydrogen, R²⁰: hydrogen, x=1], 1-methyl-2-butynyl formate [R³: methyl, R⁴: methyl, R⁵: hydrogen, R²⁰: hydrogen, x=1], 1,1-dimethyl-2-propynyl formate [R³: hydrogen, R⁴; methyl, R⁵: methyl, R²⁰: hydrogen, x=1], 1,1-diethyl-2-propynyl formate [R³: hydrogen, R⁴: ethyl, R⁵: ethyl, R²⁰: hydrogen, x=1], 1,1-ethylmethyl-2-propynyl formate [R³: hydrogen, R⁴: ethyl, R⁵: methyl, R²⁰: hydrogen, x=1], 1,1-isobutylmethyl-2-propynyl formate [R³: hydrogen, R⁴: isobutyl, R⁵: methyl, R²⁰: hydrogen, x=1], 1,1-dimethyl-2-butynyl formate [R³: methyl, R⁴: methyl, R⁵: methyl, R²⁰: hydrogen, x=1], 1-ethynyl-cyclohexyl formate [R³: hydrogen, R⁴ and R⁵ are combined to form pentamethylene, R²⁰: hydrogen, x=1], 1,1-phenylmethyl-2-propynyl formate [R³: hydrogen, R⁴: phenyl, R⁵: methyl, R²⁰: hydrogen, x=1], 1,1-diphenyl-2-propynyl formate [R³: hydrogen, R⁴: phenyl, R⁵: phenyl, R²⁰: hydrogen, x=1], 2-butynyl acetate [R³: methyl, R⁴: hydrogen, R⁵: hydrogen, R²⁰: methyl, x=1], 3-butynyl acetate [R³: hydrogen, R⁴: hydrogen, R⁵; hydrogen, R²⁰: methyl, x=2], 2-pentynyl acetate [R³: ethyl, R⁴: hydrogen, R⁵: hydrogen, R²⁰: methyl, x=1], 1-methyl-2-butynyl acetate [R³: methyl, R⁴: methyl, R⁵: hydrogen, R²⁰: methyl, x=1], 1,1-dimethyl-2-propynyl acetate [R³: hydrogen, R⁴: methyl, R⁵; methyl, R²⁰: methyl, x=1], 1,1-diethyl-2-propynyl acetate [R³: hydrogen, R⁴: ethyl, R⁵: ethyl, R²⁰: methyl, x=1], 1,1-ethylmethyl-2-propynyl acetate [R³: hydrogen, R⁴: ethyl, R⁵: methyl, R²⁰: methyl, x=1], 1,1-isobutylmethyl-2-propynyl acetate [R³: hydrogen, R⁴: isobutyl, R⁵: methyl, R²⁰: methyl, x=1], 1,1-dimethyl-2-butynyl acetate [R³: methyl, R⁴: methyl, R⁵: methyl, R²⁰: methyl, x=1], 1-ethynylcyclohexyl acetate [R³: hydrogen, R⁴ and R⁵ are combined to form pentamethylene, R²⁰: methyl, x=1], 1,1-phenylmethyl-2-propynyl acetate [R³: hydrogen, R⁴: phenyl, R⁵: methyl, R²⁰: methyl, x=1], 1,1-diphenyl-2-propynyl acetate [R³: hydrogen, R⁴: phenyl, R⁵: phenyl, R²⁰: methyl, x=1], and 1,1-dimethyl-2-propynyl propionate [R³: hydrogen, R⁴: methyl, R⁵: methyl, R²⁰: ethyl, x=1].

Examples of the triple bond-containing compounds represented by the formula (II) in the case where Y¹ is —SO₂R²⁰ include: 2-propynyl methanesulfonate [R³: hydrogen, R⁴ hydrogen, R⁵: hydrogen, R²⁰: methyl, x=1], 3-methyl-2-propynyl methanesulfonate [R³: hydrogen, R⁴: methyl, R⁵: hydrogen, R²⁰: methyl, x=1], 2-propynyl ethanesulfonate [R³: hydrogen, R⁴: hydrogen, R⁵: hydrogen, R²⁰: ethyl, x=1], 2-propynyl propanesulfonate [R³: hydrogen, R⁴: hydrogen, R⁵: hydrogen, R²⁰: propyl, x=1], 2-propynyl p-toluenesulfonate [R³: hydrogen, R⁴: hydrogen, R⁵: hydrogen, R²⁰; p-tolyl, x=1], 2-propynyl cyclohexylsulfonate [R³: hydrogen, R⁴: hydrogen, R⁵: hydrogen, R²⁰: cyclohexyl, x=1], 2-butynyl methanesulfonate [R³: methyl, R⁴: hydrogen, R⁵: hydrogen, R²⁰: methyl, x=1], 3-butynyl methanesulfonate [R³: hydrogen, R⁴: hydrogen, R⁵: hydrogen, R²⁰: methyl, x=2], 2-pentynyl methanesulfonate [R³: ethyl, R⁴: hydrogen, R⁵: hydrogen, R²⁰: methyl, x=1], 1-methyl-2-butynyl methanesulfonate [R³: methyl, R⁴: methyl, R⁵: hydrogen, R²⁰: methyl, x=1], 1,1-dimethyl-2-propynyl methanesulfonate [R³: hydrogen, R⁴: methyl, R⁵: methyl, R²⁰: methyl, x=1], 1,1-diethyl-2-propynyl methane sulfonate [R³: hydrogen, R⁴: ethyl, R⁵: ethyl, R²⁰: methyl, x=1], 1,1-ethylmethyl-2-propynyl methanesulfonate [R³: hydrogen, R⁴: ethyl, R⁵: methyl, R²⁰: methyl, x=1], 1,1-isobutylmethyl-2-propynyl methanesulfonate [R³: hydrogen, R⁴: isobutyl, R⁵: methyl, R²⁰: methyl, x=1], 1,1-dimethyl-2-butynyl methanesulfonate [R³: methyl, R⁴: methyl, R⁵: methyl, R²⁰: methyl, x=1], 1-ethynylcyclohexyl methanesulfonate [$R^3$: hydrogen, $R^4$ and $R^5$ are combined to form pentamethylene, $R^{20}$: methyl, x=1], 1,1-phenylmethyl-2-propynyl methanesulfonate [$R^3$: hydrogen, $R^4$: phenyl, $R^5$: methyl, $R^{20}$: methyl, x=1], 1,1-diphenyl-2-propynyl methanesulfonate [$R^3$: hydrogen, $R^4$: phenyl, $R^5$: phenyl, $R^{20}$: methyl, x=1], and 1,1-dimethyl-2-propynyl ethanesulfonate [$R^3$: hydrogen, $R^4$: methyl, $R^5$: methyl, $R^{20}$: ethyl, x=1].

Examples of the triple bond-containing compounds represented by the formula (III) in the case where $Y^2$ and $Y^3$ are —$COOR^{21}$ and —$COOR^{22}$, respectively, include: 2-butyne-1,4-diol dimethyl carbonate [$R^6$: hydrogen, $R^7$: hydrogen, $R^8$: hydrogen, $R^9$: hydrogen, $R^{21}$: methyl, $R^{22}$: methyl, x=1], 2-butyne-1,4-diol diethyl carbonate [$R^6$: hydrogen, $R^7$: hydrogen, $R^8$: hydrogen, $R^9$: hydrogen, $R^{21}$: ethyl, $R^{22}$: ethyl, x=1], 3-hexyne-2,5-diol dimethyl dicarbonate [$R^6$: methyl, $R^7$: hydrogen, $R^8$: methyl, $R^9$: hydrogen, $R^{21}$: methyl, $R^{22}$: methyl, x=1], 3-hexyne-2,5-diol diethyl dicarbonate [$R^6$: methyl, $R^7$: hydrogen, $R^8$: methyl, $R^9$: hydrogen, $R^{21}$: ethyl, $R^{22}$: ethyl, x=1], 2,5-dimethyl-3-hexyne-2,5-diol dimethyl dicarbonate [$R^6$: methyl, $R^7$: methyl, $R^8$: methyl, $R^9$: methyl, $R^{21}$: methyl, $R^{22}$: methyl, x=1], and 2,5-dimethyl-3-hexyne-2,5-diol diethyl dicarbonate [$R^6$: methyl, $R^7$: methyl, $R^8$: methyl, $R^9$: methyl, $R^{21}$: ethyl, $R^{22}$: ethyl, x=1].

Examples of the triple bond-containing compounds represented by the formula (III) in the case where $Y^2$ and $Y^3$ are —$COR^{21}$ and —$COR^{22}$, respectively, include: 2-butyne-1,4-diol diformate. [$R^6$; hydrogen, $R^7$: hydrogen, $R^8$: hydrogen, $R^9$: hydrogen, $R^{21}$: hydrogen, $R^{22}$: hydrogen, x=1], 2-butyne-1,4-diol diacetate [$R^6$: hydrogen, $R^7$: hydrogen, $R^8$: hydrogen, $R^9$: hydrogen, $R^{21}$: methyl, $R^{22}$: methyl, x=1], 2-butyne-1,4-diol dipropionate [$R^6$: hydrogen, $R^7$: hydrogen, $R^8$: hydrogen, $R^9$: hydrogen, $R^{21}$: ethyl, $R^{22}$: ethyl, x=1], 3-hexyne-2,5-diol diformate [$R^6$: methyl, $R^7$: hydrogen, $R^8$: methyl, $R^9$: hydrogen, $R^{21}$: hydrogen, $R^{22}$: hydrogen, x=1], 3-hexyne-2,5-diol diacetate [$R^6$: methyl, $R^7$: hydrogen, $R^8$: methyl, $R^9$: hydrogen, $R^{21}$: methyl, $R^{22}$: methyl, p=1], 3-hexyne-2,5-diol dipropionate [$R^6$: methyl, $R^7$: hydrogen, $R^8$: methyl, $R^9$: hydrogen, $R^{21}$: ethyl, $R^{22}$: ethyl, x=1], 2,5-dimethyl-3-hexyne-2,5-diol diformate [$R^6$: methyl, $R^7$: methyl, $R^8$: methyl, $R^9$: methyl, $R^{21}$: hydrogen, $R^{22}$: hydrogen, x=1], 2,5-dimethyl-3-hexyne-2,5-diol diacetate [$R^6$: methyl, $R^7$: methyl, $R^8$: methyl, $R^9$: methyl, $R^{21}$: methyl, $R^{22}$: methyl, x=1], and 2,5-dimethyl-3-hexyne-2,5-diol dipropionate [$R^6$: methyl, $R^7$: methyl, $R^8$: methyl, $R^9$: methyl, $R^{21}$: ethyl, $R^{22}$: ethyl, x=1].

Examples of the triple bond-containing compounds represented by the formula (III) in the case where $Y^2$ and $Y^3$ are —$SO_2R^{21}$ and —$SO_2R^{22}$, respectively, include: 2-butyne-1,4-diol dimethanesulfonate [$R^6$: hydrogen, $R^7$: hydrogen, $R^8$: hydrogen, $R^9$: hydrogen, $R^{21}$: methyl, $R^{22}$: methyl, x=1], 2-butyne-1,4-diol diethanesulfonate [$R^6$: hydrogen, $R^7$: hydrogen, $R^7$: hydrogen, $R^8$; hydrogen, $R^{21}$: ethyl, $R^{22}$; ethyl, x=1], 3-hexyne-2,5-diol dimethanesulfonate [$R^6$: methyl, $R^7$: hydrogen, $R^8$ methyl, $R^9$: hydrogen, $R^{21}$: methyl, $R^{22}$: methyl, x=1], 3-hexyne-2,5-diol diethanesulfonate [$R^6$: methyl, $R^7$: hydrogen, $R^8$: methyl, $R^9$: hydrogen, $R^{21}$: ethyl, $R^{22}$: ethyl, x=1], 2,5-dimethyl-3-hexyne-2,5-diol dimethanesulfonate [$R^6$: methyl, $R^7$: methyl, $R^8$: methyl, $R^9$: methyl, $R^{21}$: methyl, $R^{22}$: methyl, x=1], and 2,5-dimethyl-3-hexyne-2, 5-diol diethanesulfonate [$R^6$: methyl, $R^7$: methyl, $R^8$: methyl, $R^9$: methyl, $R^{21}$: ethyl, $R^{22}$: ethyl, x=1].

Examples of the triple bond-containing compounds represented by the formula (IV) in the case where IP and $Y^6$ are —$COOR^{23}$ and —$COOR^{24}$, respectively, include: 2,4-hexadiyne-1,6-diol dimethyl dicarbonate [$R^{10}$: hydrogen, $R^{11}$: hydrogen, $R^{12}$: hydrogen, $R^{13}$: hydrogen, $R^{23}$: methyl, $R^{24}$: methyl, x=1], 2,4-hexadiyne-1,6-diol diethyl dicarbonate [$R^{10}$: hydrogen, $R^{11}$: hydrogen, $R^{12}$: hydrogen, $R^{13}$: hydrogen, $R^{23}$: ethyl, $R^{24}$: ethyl, x=1], 2,7-dimethyl-3,5-octadiyne-2,7-diol dimethyl dicarbonate [$R^{10}$: methyl, $R^{11}$: methyl, $R^{12}$: methyl, $R^{13}$: methyl, $R^{23}$: methyl, $R^{24}$: methyl, x=1], and 2,7-dimethyl-3,5-octadiyne-2,7-diol diethyl dicarbonate [$R^{10}$: methyl, $R^{11}$: methyl, $R^{12}$: methyl, $R^{13}$: methyl, $R^{23}$: ethyl, $R^{24}$: ethyl, x=1].

Examples of the triple bond-containing compounds represented by the formula (IV) in the case where $Y^4$ and $Y^5$ are —$COR^{23}$ and —$COR^{24}$, respectively, include: 2,4-hexadiyne-1, 6-diol diformate [$R^{10}$: hydrogen, $R^{11}$: hydrogen, $R^{12}$: hydrogen, $R^{13}$: hydrogen, $R^{23}$: hydrogen, $R^{24}$: hydrogen, x=1], 2,4-hexadiyne-1,6-diol diacetate [$R^{10}$: hydrogen, $R^{11}$: hydrogen, $R^{12}$: hydrogen, $R^{13}$: hydrogen, $R^{23}$: methyl, $R^{24}$: methyl, x=1], 2,4-hexadiyne-1,6-diol dipropionate [$R^{10}$: hydrogen, $R^{11}$: hydrogen, $R^{12}$: hydrogen, $R^{13}$: hydrogen, $R^{23}$: ethyl, $R^{24}$: ethyl, x=1], 2,7-dimethyl-3,5-octadiyne-2,7-diol diformate [$R^{10}$: methyl, $R^{11}$: methyl, $R^{12}$: methyl, $R^{13}$: methyl, $R^{23}$: hydrogen, $R^{24}$: hydrogen, x=1], 2,7-dimethyl-3,5-octadiyne-2,7-diol diacetate [$R^{10}$: methyl, $R^{11}$: methyl, $R^{12}$: methyl, $R^{13}$: methyl, $R^{23}$: methyl, $R^{24}$: methyl, x=1], and 2,7-dimethyl-3,5-octadiyne-2,7-diol-dipropionate [$R^{10}$; methyl, $R^{11}$: methyl, $R^{12}$: methyl, $R^{13}$: methyl, $R^{23}$; ethyl, $R^{24}$: ethyl, x=1].

Examples of the triple bond-containing compounds represented by the formula (IV) in the case where $Y^4$ and $Y^5$ are —$SO_2R^{23}$ and —$SO_2R^{24}$, respectively, include: 2,4-hexadiyne-1,6-diol dimethanesulfonate [$R^{10}$: hydrogen, $R^{11}$: hydrogen, $R^{12}$: hydrogen, $R^{13}$: hydrogen, $R^{23}$: methyl, $R^{24}$: methyl, x=1], 2,4-hexadiyne-1,6-diol diethanesulfonate [$R^{10}$: hydrogen, $R^{11}$: hydrogen, $R^{12}$: hydrogen, $R^{13}$: hydrogen, $R^{23}$: ethyl, $R^{24}$: ethyl, x=1], 2,7-dimethyl-3,5-octadiyne-2,7-diol dimethanesulfonate [$R^{10}$: methyl, $R^{11}$: methyl, $R^{12}$: methyl, $R^{13}$: methyl, $R^{23}$: methyl, $R^{24}$: methyl, x=1], and 2,7-dimethyl-3,5-octadiyne-2,71-diol diethanesulfonate [$R^{10}$: methyl, $R^{11}$: methyl, $R^{12}$: methyl, $R^{13}$: methyl, $R^{23}$: ethyl, $R^{24}$: ethyl, x=1].

Examples of the triple bond-containing compounds represented by the formula (V) include: dipropargyl carbonate [$R^{14}$: hydrogen, $R^{15}$: hydrogen, $R^{16}$: hydrogen, $R^{17}$: hydrogen, $R^{18}$: hydrogen, $R^{19}$: hydrogen, x=1], di(1-methyl-2-propynyl) carbonate [$R^{14}$: hydrogen, $R^{15}$: methyl, $R^{16}$: hydrogen, $R^{17}$: methyl, $R^{18}$: hydrogen, $R^{19}$: hydrogen, x=1], 1di(2-butynyl) carbonate [$R^{14}$: methyl, $R^{15}$: hydrogen, $R^{16}$: hydrogen, $R^{17}$: hydrogen, $R^{18}$: hydrogen, $R^{19}$: methyl, x=1], di(3-butynyl) carbonate [$R^{14}$: hydrogen, $R^{15}$: hydrogen, $R^{16}$: hydrogen, $R^{17}$: hydrogen, $R^{18}$: hydrogen, $R^{19}$: hydrogen, x=2], di(2-pentynyl) carbonate [$R^{14}$: ethyl, $R^{15}$: hydrogen, $R^{16}$: hydrogen, $R^{17}$: hydrogen, $R^{18}$: hydrogen, $R^{19}$: ethyl, x=1], di(1-methyl-2-butynyl) carbonate [$R^{14}$: methyl, $R^{15}$: methyl, $R^{16}$: methyl; $R^{17}$: hydrogen, $R^{18}$: hydrogen, $R^{19}$: methyl, x=1], 2-propynyl 2-butynyl carbonate [$R^{14}$: hydrogen, $R^{15}$: hydrogen, $R^{16}$: hydrogen, $R^{17}$: hydrogen, $R^{18}$: hydrogen, $R^{19}$: methyl, x=1], di(1,1-dimethyl-2-propynyl) carbonate [$R^{14}$: hydrogen, $R^{15}$: methyl, $R^{16}$: methyl, $R^{17}$: methyl, $R^{18}$: methyl, $R^{19}$: hydrogen, x=1], di(1,1-diethyl-2-propynyl) carbonate [$R^{14}$: hydrogen, $R^{15}$: ethyl, $R^{16}$: ethyl, $R^{17}$: ethyl, $R^{18}$: ethyl, $R^{19}$: hydrogen, x=1], di(1,1-ethylmethyl-2-propynyl) carbonate [$R^{14}$: hydrogen, $R^{15}$: ethyl, $R^{16}$: methyl, $R^{17}$: ethyl, $R^{18}$: methyl, $R^{19}$ hydrogen, x=$_1$], di(1,1-isobutylmethyl-2-propynyl) carbonate [$R^{14}$ hydrogen, $R^{15}$: isobutyl, $R^{16}$: methyl, $R^{17}$: isobutyl, $R^{18}$: methyl, $R^{19}$: hydrogen, x=1], di(1,1-dimethyl-2-butynyl) carbonate [$R^{14}$: methyl, $R^{15}$: methyl, $R^{16}$: methyl, $R^{17}$: methyl, $R^{18}$: methyl, $R^{19}$: methyl, x=1], and di(1-ethynylcyclohexyl) carbonate

[$R^{14}$: hydrogen, $R^{15}$ and $R^{16}$ are combined to form pentamethylene, $R^{17}$ and $R^{18}$ are combined to form pentamethylene, $R^{19}$; hydrogen, x=1].

Examples of the triple bond-containing compounds represented by the formula (VI) in the case where W is sulfoxide include: di(2-propynyl) sulfite [$R^{25}$: hydrogen, $R^{26}$: hydrogen, $R^{27}$: hydrogen, $Y^{6}$: 2-propynyl, x=1], di(1-methyl-2-propynyl) sulfite [$R^{25}$: hydrogen, $R^{26}$: methyl, $R^{27}$: hydrogen, $Y^{6}$: 1-methyl-2-propynyl, x=1], di(2-butynyl) sulfite [$R^{25}$: methyl, $R^{26}$: hydrogen, $R^{27}$: hydrogen, $Y^{6}$: 2-butynyl, x=1], di(3-butynyl) sulfite [$R^{25}$: hydrogen, $R^{26}$: hydrogen, $R^{27}$: hydrogen, $Y^{6}$: 3-butynyl, x=2], di(2-pentynyl) sulfite [$R^{25}$: ethyl, $R^{26}$: hydrogen, $R^{27}$: hydrogen, $Y^{6}$: 2-pentynyl, x=1], di(1-methyl-2-butynyl) sulfite [$R^{25}$: methyl, $R^{26}$: methyl, $R^{27}$: hydrogen, $Y^{6}$: 1-methyl-2-butynyl, x=1], di(1,1-dimethyl-2-propynyl) sulfite [$R^{25}$: hydrogen, $R^{26}$: methyl, $R^{27}$: methyl, $Y^{6}$: 1,1-dimethyl-2-propynyl, x=1], di(1,1-diethyl-2-propynyl) sulfite [$R^{25}$: hydrogen, $R^{26}$: ethyl, $R^{27}$: ethyl, $Y^{6}$: 1,1-diethyl-2-propynyl, x=1], di(1-ethyl-1-methyl-2-propynyl) sulfite [$R^{25}$: hydrogen, $R^{26}$: ethyl, $R^{27}$: methyl, $Y^{6}$: 1-ethyl-1-methyl-2-propynyl, x=1], di(1-isobutyl-1-methyl-2-propynyl) sulfite [$R^{25}$: hydrogen, $R^{26}$: isobutyl, $R^{27}$: methyl, $Y^{6}$: 1-isobutyl-1-methyl-2-propynyl, x=1], di(1,1-dimethyl-2-butynyl) sulfite [$R^{25}$: methyl, $R^{26}$: methyl, $R^{27}$: methyl, $Y^{6}$: 1,1-dimethyl-2-butynyl, x=1], di(1-ethynylcyclohexyl) sulfite [$R^{25}$: hydrogen, $R^{26}$ and $R^{27}$ are combined to form pentamethylene, $Y^{6}$: 1-ethynylcyclohexyl, x=1], di(1-methyl-1-phenyl-2-propynyl) sulfite [$R^{25}$: hydrogen, $R^{26}$: phenyl, $R^{27}$: methyl, $Y^{6}$: 1-methyl-1-phenyl-2-propynyl, x=1], di(1,1-diphenyl-2-propynyl) sulfite [$R^{25}$: hydrogen, $R^{26}$: phenyl, $R^{27}$: phenyl, $Y^{6}$: 1,1-diphenyl-2-propynyl, x=1], methyl 2-propynyl sulfite [$R^{25}$: hydrogen, $R^{26}$: hydrogen, 27: hydrogen, $Y^{6}$: methyl, x=1], methyl 1-methyl-2-propynyl sulfite [$R^{25}$: hydrogen, $R^{26}$: methyl, $R^{27}$: hydrogen, $Y^{6}$: methyl, x=1], ethyl 2-propynyl sulfite [$R^{25}$: hydrogen, $R^{26}$: hydrogen, $R^{27}$ hydrogen, $Y^{6}$: ethyl, x=1], phenyl 2-propynyl sulfite [$R^{25}$: hydrogen, $R^{26}$: hydrogen, $R^{27}$: hydrogen, $Y^{6}$: phenyl, x=1], and cyclohexyl 2-propynyl sulfite [$R^{25}$: hydrogen, $R^{26}$: hydrogen, $R^{27}$: hydrogen, $Y^{6}$: cyclohexyl, x=1].

Examples of the triple bond-containing compounds represented by the formula (VI) in the case where W is sulfone include: di(2-propynyl) sulfate [$R^{25}$: hydrogen, $R^{26}$: hydrogen, $R^{27}$: hydrogen, $Y^{6}$: 2-propynyl, x=1], di(1-methyl-2-propynyl) sulfate [$R^{25}$: hydrogen, $R^{26}$: methyl, $R^{27}$: hydrogen, $Y^{6}$: 1-methyl-2-propynyl, x=1], di(2-butynyl) sulfate [$R^{25}$: methyl, $R^{26}$: hydrogen, $R^{27}$: hydrogen, $Y^{6}$: 2-butynyl, x=1], di(3-butynyl) sulfate [$R^{25}$: hydrogen, $R^{26}$: hydrogen, $R^{27}$: hydrogen, $Y^{6}$: 3 butynyl, x=2], di(2-pentynyl) sulfate [$R^{25}$: ethyl, $R^{26}$: hydrogen, $R^{27}$: hydrogen, $Y^{6}$: 2-pentynyl, x=1], di(1-methyl-2-butynyl) sulfate [$R^{25}$: methyl, $R^{26}$: methyl, $R^{27}$: hydrogen, $Y^{6}$: 1-methyl-2-butynyl, x=1], di(1,1-dimethyl-2-propynyl) sulfate [$R^{25}$: hydrogen, $R^{26}$: methyl, $R^{27}$: methyl, $Y^{6}$: 1,1-dimethyl-2-propynyl, x=1], di(1,1-diethyl-2-propynyl) sulfate [$R^{25}$: hydrogen, $R^{26}$: ethyl, $R^{27}$: ethyl, $Y^{6}$: 1,1-diethyl-2-propynyl, x=1], di(1-ethyl-1-methyl-2-propynyl) sulfate [$R^{25}$: hydrogen, $R^{26}$: ethyl, $R^{27}$: methyl, $Y^{6}$: 1-ethyl-1-methyl-2-propynyl, x=1], di(1-isobutyl-1-methyl-2-propynyl) sulfate [$R^{25}$: hydrogen, $R^{26}$: isobutyl, $R^{27}$: methyl, $Y^{6}$: 1-isobutyl-1-methyl-2-propynyl, x=1], di(1,1-dimethyl-2-butynyl) sulfate [$R^{25}$: methyl, $R^{26}$: methyl, $R^{27}$: methyl, $Y^{6}$: 1,1-dimethyl-2-butynyl, x=1], di(1-ethynylcyclohexyl) sulfate [$R^{25}$: hydrogen, $R^{26}$ and $R^{27}$ are combined to form pentamethylene, $Y^{6}$: 1-ethynylcyclohexyl, x=1], di(1-methyl-1-phenyl-2-propynyl) sulfate [$R^{25}$: hydrogen, $R^{26}$: phenyl, $R^{27}$: methyl, $Y^{6}$: 1-methyl-1-phenyl-2-propynyl, x=1], di(1,1-diphenyl-2-propynyl) sulfate [$R^{25}$: hydrogen, $R^{26}$: phenyl, $R^{27}$: phenyl, $Y^{6}$: 1,1-diphenyl-2-propynyl, x=1], methyl 2-propynyl sulfate [$R^{25}$: hydrogen, $R^{26}$: hydrogen, $R^{27}$: hydrogen, $Y^{6}$: methyl, x=1], methyl 1-methyl-2-propynyl sulfate [$R^{25}$: hydrogen, $R^{26}$: methyl, $R^{27}$: hydrogen, $Y^{6}$: methyl, x=1], ethyl 2-propynyl sulfate [$R^{25}$: hydrogen, $R^{26}$: hydrogen, $R^{27}$: hydrogen, $Y^{6}$: ethyl, x=$_{1}$], phenyl 2-propynyl sulfate [$R^{25}$: hydrogen, $R^{26}$: hydrogen, $R^{27}$: hydrogen, $Y^{6}$: phenyl, x=1], and cyclohexyl 2-propynyl sulfate [$R^{25}$: hydrogen, $R^{26}$: hydrogen, $R^{27}$: hydrogen, $Y^{6}$: cyclohexyl, x=1].

Examples of the triple bond-containing compounds represented by the formula (VI) in the case where W is oxalyl include: di(2-propynyl) oxalate [$R^{25}$: hydrogen, $R^{26}$: hydrogen, $R^{27}$: hydrogen, $Y^{6}$: 2-propynyl, x=1], di(1-methyl-2-propynyl) oxalate [$R^{25}$: hydrogen, $R^{26}$: methyl, $R^{27}$: hydrogen, $Y^{6}$: 1-methyl-2-propynyl, x=1], di(2-butynyl) oxalate [$R^{25}$: methyl, $R^{26}$: hydrogen, $R^{27}$: hydrogen, $Y^{6}$: 2-butynyl, x=1], di(3-butynyl) oxalate [$R^{25}$: hydrogen, $R^{26}$: hydrogen, $R^{27}$: hydrogen, $Y^{6}$: 3-butynyl, x=2], di(2-pentynyl) oxalate [$R^{25}$: ethyl, $R^{26}$: hydrogen, $R^{27}$: hydrogen, $Y^{6}$: 2-pentynyl, x=1], di(1-methyl-2-butynyl) oxalate [$R^{25}$: methyl, $R^{26}$: methyl, $R^{27}$: hydrogen, $Y^{6}$: 1-methyl-2-butynyl, x=1], di(1,1-dimethyl-2-propynyl) oxalate [$R^{25}$: hydrogen, $R^{26}$: methyl, $R^{27}$: methyl, $Y^{6}$: 1,1-dimethyl-2-propynyl, x=1], di(1,1-diethyl-2-propynyl) oxalate [$R^{25}$: hydrogen, $R^{26}$: ethyl, $R^{27}$: ethyl, $Y^{6}$: 1,1-diethyl-2-propynyl, x=1], di(1-ethyl-1-methyl-2-propynyl) oxalate [$R^{25}$: hydrogen, $R^{26}$: ethyl, $R^{27}$ methyl, $Y^{6}$: 1-ethyl-1-methyl-2-propynyl, x=1], di(1-isobutyl-1-methyl-2-propynyl) oxalate [$R^{25}$: hydrogen, $R^{26}$: isobutyl, $R^{27}$: methyl, $Y^{6}$: 1-isobutyl-1-methyl-2-propynyl, x=1], di(1,1-dimethyl-2-butynyl) oxalate [$R^{25}$: methyl, $R^{26}$: methyl, $R^{27}$: methyl, $Y^{6}$: 1,1-dimethyl-2-butynyl, x=1], di(1-ethynylcyclohexyl) oxalate [$R^{25}$: hydrogen, $R^{26}$ and $R^{27}$ are combined to form pentamethylene, $Y^{6}$: 1-ethynylcyclohexyl, x=1], di(1-methyl-1-phenyl-2-propynyl) oxalate [$R^{25}$: hydrogen, $R^{26}$: phenyl, $R^{27}$: methyl, $Y^{6}$: 1-methyl-1-phenyl-2-propynyl, x=1], di(1,1-diphenyl-2-propynyl) oxalate [$R^{25}$: hydrogen, $R^{26}$: phenyl, $R^{27}$: phenyl, $Y^{6}$: 1,1-diphenyl-2-propynyl, x=1], methyl 2-propynyl oxalate [$R^{25}$: hydrogen, $R^{26}$: hydrogen, $R^{27}$: hydrogen, $Y^{6}$: methyl, x=1], methyl 1-methyl-2-propynyl oxalate [$R^{25}$: hydrogen, $R^{26}$: methyl, $R^{27}$: hydrogen, $Y^{6}$: methyl, x=1], ethyl 2-propynyl oxalate [$R^{25}$: hydrogen, $R^{26}$: hydrogen, $R^{27}$: hydrogen, $Y^{6}$: ethyl, x=1], phenyl 2-propynyl oxalate [$R^{25}$: hydrogen, $R^{26}$: hydrogen, $R^{27}$: hydrogen, $Y^{6}$: phenyl, x=1], and cyclohexyl 2-propynyl oxalate [$R^{25}$: hydrogen, $R^{26}$: hydrogen, $R^{27}$: oxygen, $Y^{6}$: cyclohexyl, x=1].

The triple bond-containing compound preferably is at least one selected from the group consisting of 2-propynyl methyl carbonate, 2-propynyl methanesulfonate, 2-butyne-1,4-diol dimethyl carbonate, 2-butyne-1,4-diol diformate, 2-butyne-1,4-diol dimethanesulfonate, 2,4-hexadiyne-1,6-diol dimethyl dicarbonate, dipropargyl carbonate, di(2-propynyl) sulfite, di(2-propynyl) sulfate, di(2-propynyl) oxalate, di(1-methyl-2-propynyl) oxalate and phenylacetylene. Nonaqueous electrolytic solutions containing those triple bond-containing compounds improve battery characteristics in cycle performance, electric capacity and storage property.

The amount of the triple bond-containing compound represented by the formula (I), (II), (III), (IV), (V) or (VI) is preferably not more than 10 wt. %, more preferably not more than 5 wt. %, based on the weight of the nonaqueous electrolytic solution. At the same time, the amount is preferably not less than 0.01 wt. %, more preferably not less than 0.05 wt. %, most preferably not less than 0.1 wt. %, based on the weight of the solution. If the amount is too large, the battery performances are often impaired because the electroconductivity of the solution unfavorably changes. If the amount is too small, the battery performances cannot be enough improved since the satisfactory surface film is not formed.

Examples of the non-aqueous solvents employed in the electrolytic solution of the invention are cyclic carbonates such as ethylene carbonate (EC), propylene carbonate (PC), butylene carbonate (BC) and vinylethylene carbonate (VEC); lactones such as γ-butyrolactone (GBL), γ-valerolactone (GVL) and α-angelica lactone (AGL); linear carbonates such as dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC); ethers such as tetrahydrofuran, 2-methyltetrahydrofuran, 1,4-dioxane, 1,2-dimethoxyethane, 1,2-diethoxyethane and 1,2-dibutoxyethane; nitrites such as acetonitrile and adiponitrile; linear esters such as methyl propionate, methyl pivalate, butyl pivalate and octyl pivalate; amides such as dimethyl formamide; phosphates such as trimethyl phosphate and trioctyl phosphate; and compounds containing S=O group such as dimethyl sulfone and divinyl sulfone.

The non-aqueous solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. Preferred are a combination of cyclic carbonate-linear ester and a combination of cyclic carbonate-lactone-linear ester. The ratio between cyclic carbonate and linear carbonate is in the range of 1:9 to 10:0, preferably 2:8 to 7:3, by volume.

Examples of the electrolytic salts employable in the invention include $LiPF_6$, $LiBF_4$, $LiClO_4$, lithium salts having linear alkyl groups such as $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3$-(iso-$C_3F_7$)$_3$, and $LiPF_5$(iso-$C_3F_7$), and lithium salts having cyclic alkyl groups such as $(CF_2)_2(SO_2)_2NLi$ and $(CF_2)_3(SO_2)_2NLi$. Preferred are $LiPF_6$, $LiBF_4$ and $LiN(SO_2CF_3)_2$, and particularly preferred is $LiPF_6$. These electrolytic salts can be employed singly or in combination of two or more. Examples of the combinations include $LiPF_6$—$LiBF_4$, $LiPF_6$—$LiN(SO_2CF_3)_2$, and $LiBF_4$—$LiN(SO_2CF_3)_2$. Preferred is a combination of $LiPF_6$—$LiBF_4$. In the case where some electrolytic salts are mixed to use, they can be mixed in a desired ratio. In case of mixing $LiPF_6$ and other salts, the amount of the salts other than $LiPF_6$ is preferably not less than 0.01 mol. % based on the total amount of salts, more preferably not less than 0.05 mol. %, most preferably not less than 0.1 mol. %, and preferably not more than 45 mol. %, more preferably not more than 20 mol. %, further preferably not more than 10 mol. %, most preferably not more than 5 mol. %.

The electrolytic salt can be incorporated into the nonaqueous solvent generally in such an amount as to give an electrolytic solution of generally not less than 0.3 M, preferably not less than 0.5 M, more preferably not less than 0.7 M, most preferably not less than 0.8 M. At the same time, the electrolytic solution is preferably not more than 2.5 M, more preferably not more than 2.0 M, further preferably not more than 1.6 M, most preferably not more than 1.2 M.

The electrolytic solution of the invention can be prepared, for instance, by mixing the non-aqueous solvents such as ethylene carbonate, propylene carbonate and ethyl methyl carbonate; dissolving the above-mentioned electrolytic salt in the mixture; and further dissolving the sulfur-containing acid ester and one or more of the triple bond-containing compounds represented by the formulas (I), (II), (III), (IV), (V) and (VI) in the resulting mixture.

If air or carbon dioxide, for example, is incorporated into the electrolytic solution of the invention, the solution can be prevented from decomposition and hence from gas generation. Consequently, battery performances such as cycle performance and storage property can be improved. For the purpose of incorporating (dissolving) air or carbon dioxide in the electrolytic solution, (1) the solution is brought into contact with air or a carbon dioxide-containing gas before it is poured into the battery, or otherwise (2) the solution is first poured into the battery, and then the container is filled with air or a carbon dioxide-containing gas before sealed.

Either (1) or (2) may be adopted, and they may be performed in combination. The air or carbon dioxide-containing gas preferably contains moisture as little as possible, and hence the dew point is preferably −40° C. or lower, more preferably −50° C. or lower.

In order to ensure safety when the battery is over-charged, the nonaqueous electrolytic solution of the invention can contain at least one aromatic compound selected from the group consisting of cyclohexylbenzene, fluorocyclohexylbenzenes (e.g., 1-fluoro-2-cyclohexylbenzene, 1-fluoro-3-cyclohexylbenzene, 1-fluoro-4-cyclohexylbenzene), biphenyl, (o-, m-, p-)terphenyl, diphenyl ether, 2-fluorodiphenyl ether, 4-diphenyl ether, fluorobenzene, (o-, m-, p-)difluorobenzene, 2-fluorobiphenyl, 4-fluorobiphenyl, 2,4-difluoroanisole, tert-butylbenzene, 1-fluoro-4-tert-butylbenzene, tert-amylbenzene, 4-tertbutylbiphenyl, tert-amylbiphenyl, partial hydrides of o-terphenyl (e.g., 1,2-dicyclohexylbenzene, 2-phenylbicyclohexyl, 1,2-diphenylcyclohexane, o-cyclohexylbiphenyl, its m-isomer, and its p-isomer), partial hydrides of m-terphenyl and partial hydrides of p-terphenyl (examples thereof are similar to those of o-body). The aunt of the aromatic compound is in the range of 0.1 to 5 wt. %; based on the weight of the electrolytic solution. The incorporation of the above-mentioned compound is effective to ensure safety of a battery under over-charged conditions.

The above-mentioned aromatic compounds can be used in combination of two or more. Examples of the combinations include: biphenyl and cyclohexylbenzene, cyclohexylbenzene and tert-butylbenzene, cyclohexybenzene and tert-amylbenzene, biphenyl and fluorobenzene, cyclohexylbenzene and fluorobenzene, 2,4-difluoroanisole and cyclohexylbenzene, cyclohexylbenzene and 1-fluoro-4-tert-butylbenzene, cyclohexylbenzene and a fluoro-cyclohexylbenzene compound, a fluorocyclohexylbenzene compound and fluorobenzene, and 2,4-difluoroanisole and a fluoro-cyclohexylbenzene compound. The mixing ratio (by weight) is preferably in the range of 50:50 to 10:90, more preferably in the range of 50:50 to 20:80, most preferably in the range of 50:50 to 25:75. In the nonaqueous electrolytic solution containing the sulfur-containing acid ester and the triple bond-containing compound, a fluorine-substituted aromatic compound is preferably added. It is more preferred to incorporate a fluorocyclohexylbenzene compound.

The nonaqueous electrolytic solution of the invention is used in a lithium secondary battery. Other components of the battery are not particularly restricted, and hence various known components can be used.

For instance, the active material of positive electrode is a compound metal oxide comprising lithium and cobalt, manganese or nickel. The active material of positive electrode can be used singly or in combination. Examples of the compound metal oxides include $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$ and $LiNi_{0.5}Mn_{1.5}O_4$. These compounds can be employed in an optional combination such as a combination of $LiCoO_2$ and $LiMn_2O_4$, a combination of $LiCoO_2$ and $LiNiO_2$, and a combination of LiMn$_2$O$_4$ and LiNiO$_2$. The active material of positive electrode is preferably a Li-contains compound metal oxide, such as LiCoO$_2$, LiMn$_2$O$_4$ or LiNiO$_2$, giving an open-circuit voltage of 4.3 V or more based on Li when charging is completed. More preferred is a Li-containing compound metal oxide, such as LiCo$_{1/3}$Ni$_{1/3}$O$_2$ or LiNi$_{0.5}$Mn$_{1.5}$O$_4$, giving a voltage of 4.4 V or more. The positive electrode composition preferably comprises a compound metal oxide of Li containing Co or Ni. The compound metal oxide of Li may be partially substituted with other elements. For example, Co in LiCoO$_2$ may be partially substituted with Sn, Mg, Fe, Ti, Al, Zr, Cr, V, Ga, Zn or Cu.

There are no specific limitations with respect to electroconductive material of the positive electrode, as long as it dose not chemically react. Examples of the electroconductive material include graphites such as natural graphite (e.g., flake graphite) and artificial graphite, and carbon blacks such as acetylene black, Ketchen black, channel black, furnace black, lamp black and thermal black. The graphites and the carbon blacks can be optionally mixed to use. The positive electrode composition contains the electroconductive material in an amount of preferably 1 to 10 wt. %, more preferably 2 to 5 wt. %.

The positive electrode can be manufactured by kneading the above-mentioned active material of positive electrode, an electroconductive material such as acetylene black or carbon black, and a binder such as poly(tetrafluoroethylene) (PTFE), poly(vinylidene fluoride) (PVDF), styrene-butadiene copolymer (SBR), acrylonitrile-butadiene copolymer (NBR) or carboxymethyl cellulose (CMC) to give a positive electrode composition; coating the positive electrode composition on a collector such as aluminum foil or a lath plate of stainless steel; drying and pressing the coated composition, and heating the pressed composition in vacuo at a temperature of approximately 50 to 250° C. for approximately 2 hours.

The negative electrode is made of a material capable of absorbing and releasing lithium ions. Examples of the material include lithium metal, lithium alloys, carbonaceous materials [pyrolytic carbonaceous substances, cokes, graphites (artificial graphite, natural graphite), fired products of organic polymer compounds and carbon fiber], tin metal, tin compounds, silicon and silicon compounds. In the case where carbonaceous materials are used as the negative electrode (active material of negative electrode), it is preferred to employ graphite having a graphite crystal structure in which the lattice distance of lattice face (002), namely, 4×2, preferably is 0.340 nm or less, more preferably in the range of 0.335 to 0.340 nm. The active materials of negative electrode can be employed singly or in combination. A powdery material such as the carbonaceous material is preferably used in combination with a binder such as ethylene propylene diene terpolymer (EPDM), poly(tetrafluoroethylene) (PTFE), poly(vinylidene fluoride) (PVDF), styrene-butadiene copolymer (SBR), acrylonitrile-butadiene copolymer (NBR) or carboxymethyl cellulose (CMC). There are no limitations with respect to the preparing method of the negative electrode. The negative electrode can be prepared by a method similar to that for the preparation of the positive electrode.

There are no specific limitations with respect to the structure of the lithium secondary battery. For instance, the lithium secondary battery can be a battery of coin type comprising a positive electrode, a negative electrode, and single or multi-layered separators, or a cylindrical or prismatic battery comprising a positive electrode, a negative electrode, and a separator roll. The separator can be a known material such as micro-porous film of polyolefin such as polypropylene or polyethylene, woven cloth, or non-woven cloth. The separator of battery may be either a single-layer porous film or a multi-layered porous film. If the separator has too high gas-permeability, the conductivity of lithium ion is often so lowered that the separator cannot function in the battery although it depends on production conditions. Accordingly, the separator used in the battery of the invention has a gas-permeability of preferably 1,000 seconds/100 cc or less, more preferably 800 seconds/100 cc or less, most preferably 500 seconds/100 cc or less. On the other hand, if the gas-permeability is too low, the separator has poor mechanical strength. Accordingly, the gas-permeability also preferably is 50 seconds/100 cc or more, further preferably 100 seconds/100 cc or more, most preferably 300 seconds/100 cc or more. The void ratio of the separator is in the range of preferably 30 to 60%, more preferably 35 to 55%, most preferably 40 to 50%, so as to improve the electric capacity of the battery. The thinner the separator is, the higher energy density the battery gives. The thickness of the separator is, therefore, preferably 50 μm or less, more preferably 40 μm or less, most preferably 25 μm or less. However, in consideration of mechanical strength, the separator has a thickness of preferably 5 μm or more, further preferably 10 μm or more, most preferably 15 μm or more.

In order that additives can work effectively in the nonaqueous electrolytic solution of the invention, it is important to control the density of each electrode composition layer. The positive electrode composition layer provided on aluminum foil has a density in the range of preferably 3.2 to 4.0 g/cm$^3$, more preferably 3.3 to 3.9 g/cm$^3$, most preferably 3.4 to 3.8 g/cm$^3$. On the other hand, the negative electrode composition layer provided on copper foil has a density in the range of preferably 1.3 to 2.0 g/cm$^3$, more preferably 1.4 to 1.9 g/cm$^3$, most preferably 1.5 to 1.8 g/cm$^3$.

The positive electrode composition layer (on one surface of the collector) has a thickness in the range of normally 30 to 120 μm, preferably 50 to 100 μm. The negative electrode composition layer (on one surface of the collector) has a thickness in the range of normally 1 to 100 μm, preferably 3 to 70 μm.

There are no specific limitations with respect to the structure of the lithium secondary battery. For instance, the lithium secondary battery can be a coin-shaped, cylindrical, prismatic or multi-layered battery comprising a positive electrode, a negative electrode and a porous separator.

The lithium secondary battery of the invention exhibits excellent cycle performance even when it is employed under the charging condition of a high terminal voltage of higher than 4.2 V, particularly higher than 4.3 V. The discharge terminal voltage can be 2.5 V or higher, moreover 2.8 V or higher. There are no specific limitation with respect to the current value, and a constant current of 0.1 to 3 C is generally adopted for discharge. The lithium secondary battery of the invention can be charged and discharged at a temperature of −40° C. or higher, preferably 0° C. or higher and of 100° C. or below, preferably 80° C. or below.

The lithium secondary battery of the invention may have a safety valve at the sealing plate to obviate increase of the inner pressure. Otherwise, a notch can be provided to the battery case or gasket. Also employable are one or more of known safety elements such as a fuse, a bimetal element, and a PTC element, each of which serves as an element for obviating overcurrent.

If desired, the lithium secondary battery of the invention can be encased in a battery pack in which plural batteries are arranged in series and/or in parallel. The battery pack can have a safety element such as a PTC element, a thermostatic fuse, a fuse and/or an electric current breaker, and further a safety circuit (i.e., a circuit capable of monitoring the voltage, temperature and current of the battery of combined battery, and then breaking the current).

Examples of the invention and comparison examples are described below.

EXAMPLE 1

[Preparation of Non-Aqueous Electrolytic Solution]

A nonaqueous solvent of EC:PC:MEC (=30:5:65, volume ratio) was prepared. In the nonaqueous solvent, $LiPF_6$ was dissolved to give a 1M nonaqueous electrolytic solution. To the nonaqueous electrolytic solution was added 1 wt. % of 2-propynyl methyl carbonate and 3 wt. % of 1,3-propanesultone (PS).

[Manufacture of Lithium Secondary Battery and Measurement of its Battery Performances]

$LiCoO_2$ (positive electrode active material, 94 wt. %), acetylene black (electroconductive material, 3 wt. %), and poly(vinylidene fluoride) (binder, 3 wt. %) were mixed. To the resulting mixture was added 1-methyl-2-pyrrolidone. Thus produced mixture was coated on aluminum foil, dried, pressed, and heated to give a positive electrode. On the other hand, artificial graphite (negative electrode active material, 95 wt. %) having a graphite crystal structure in which the lattice distance of lattice face (002), namely, $d_{002}$, was 0.335 nm and poly(vinylidene fluoride) (binder, 5 wt. %) were mixed. To the resulting mixture was added 1-methyl-2-pyrrolidone. Thus produced mixture was coated on a copper foil, dried, pressed, and heated to give a negative electrode. The positive and negative electrodes, a microporous polypropylene film separator (thickness: 20 μm), and the above-mentioned non-aqueous electrolytic solution were encased in a battery. The battery was then filled with air having a dew point of −60° C., and sealed to produce a cylindrical battery of 18650 size (diameter: 18 mm, height: 65 mm). On the produced battery, a safety valve and an internal current breaker (PTC element) were provided. The densities of the positive and negative electrodes were 3.5 g/cm³ and 1.6 g/cm³, respectively. The thickness of the positive electrode layer (on one surface of the collector) was 65 μm, and that of the negative electrode layer (on one surface of the collector) was 70 μm.

The produced battery was charged at a high temperature (60° C.) with a constant electric current (2.2 A, 1 C) to reach 4.2 V (terminal voltage), and was kept at 4.2 V. The total charging period was 3 hours. Subsequently, the battery was discharged to give a constant electric current (2.2 A, 1 C) to give a terminal voltage of 3.0V. The charging-discharging cycle procedure was repeated for 300 cycles. The initial discharge capacity (mAh) was almost the same as the capacity measured in a battery using an 1M $LiPF_6$ and EC/PC/MEC (30/5/65, volume ratio) solvent mixture containing 3 wt. % of 1,3-propanesultone and no triple bond-containing compound [Comparison Example 1]. The determined battery performances (initial discharge capacity in terms of relative value, and retention of discharge capacity after the 300 cycle charging-discharging procedure) are shown in Table 1.

EXAMPLES 2 TO 6

The procedures of Example 1 were repeated except for using 2-propynyl methanesulfonate, 2-butyne-1,4-diol dimethyl carbonate, 2-butyne-1,4-diol diformate, 2-butyne-1,4-diol dimethanesulfonate, or 2,4-hexadiyne-1,6-diol dimethyl dicarbonate as an additive in the amount of 1 wt. % based on the solution, to prepare a nonaqueous electrolytic solution and a cylindrical battery of 18650 size. The 300 cycle charging-discharging test was carried out to determine battery performances. The results are shown in Table 1.

EXAMPLE 7

The procedures of Example 1 were repeated except for using 1 wt. % of dipropargyl carbonate and 5 wt. % of 1,3-propanesultone as additives, to prepare a nonaqueous electrolytic solution and a cylindrical battery of 18650 size. The 300 cycle charging-discharging test was carried out to determine battery performances. The results are shown in Table 1.

EXAMPLE 8

The procedures of Example 1 were repeated except for using 1 wt. % of di(2-propynyl) sulfite and 3 wt. % of 1,3-propanesultone as additives, to prepare a nonaqueous electrolytic solution and a cylindrical battery of 18650 size. The 300 cycle charging-discharging test was carried out to determine battery performances. The results are shown in Table 1.

EXAMPLE 9

The procedures of Example 1 were repeated except for using 1 wt. % of di(2-propynyl) sulfate and 0.1 wt. % of 1,3-propanesultone as additives, to prepare a nonaqueous electrolytic solution and a cylindrical battery of 18650 size. The 300 cycle charging-discharging test was carried out to determine battery performances. The results are shown in Table 1.

EXAMPLES 10 TO 12

The procedures of Example 1 were repeated except for using di(2-propynyl) oxalate as an additive in place of 2-propynyl methyl carbonate in the amount of 0.1 wt. %, 1 wt. % or 5 wt. % based on the solution, to prepare a non-aqueous electrolytic solution and a cylindrical battery of 18650 size. The 300 cycle charging-discharging test was carried out to determine battery performances. The results are shown in Table 1.

EXAMPLE 13

The procedures of Example 1 were repeated except for using 0.5 wt. % of di(1-methyl-2-propynyl) oxalate and 3 wt. % of 1,3-butanesultone (BS) as additives in place of 2-propynyl methyl carbonate and 1,3-propanesultone, respectively, to prepare a nonaqueous electrolytic solution and a cylindrical battery of 18650 size. The 300 cycle charging-discharging test was carried out to determine battery performances. The results are shown in Table 1.

EXAMPLE 14

The procedures of Example 1 were repeated except for using 0.1 wt. % of phenylacetylene as an additive in place of 2-propynyl methyl carbonate, to prepare a nonaqueous electrolytic solution and a cylindrical battery of 18650 size. The 300 cycle charging-discharging test was carried out to determine battery performances. The results are shown in Table 1.

EXAMPLE 15

The procedures of Example 1 were repeated except for using 1 wt. % of 2-butyne-1,4-diol diformate and 3 wt. % of glycol sulfite (GSI) as an additives in place of 2-propynyl methyl carbonate and 1,3-propanesultone, respectively, to prepare a nonaqueous electrolytic solution and a cylindrical battery of 18650 size. The 300 cycle charging-discharging test was carried out to determine battery performances. The results are shown in Table 1.

EXAMPLE 16

The procedures of Example 1 were repeated except for using 1 wt. % of 2-butyne-1,4-diol diformate and 3 wt. % of glycol sulfate (GSA) as additives in place of 2-propynyl methyl carbonate and 1,3-propanesultone, respectively, to prepare a nonaqueous electrolytic solution and a cylindrical battery of 18650 size. The 300 cycle charging-discharging test was carried out to determine battery performances. The results are shown in Table 1.

EXAMPLE 17

The procedures of Example 1 were repeated except for using di(2-propynyl) oxalate as an additive in place of 2-propynyl methyl carbonate in the amount of 0.5 wt. % based on the solution and for using $LiMn_2O_4$ as the positive electrode (active material) in place of $LiCoO_2$, to prepare a nonaqueous electrolytic solution and a cylindrical battery of 18650 size. The 300 cycle charging-discharging test was carried out to determine battery performances. The results are shown in Table 1.

EXAMPLE 18

The procedures of Example 1 were repeated except for using 2-propynyl methyl sulfite as an additive in place of 2-propynyl methyl carbonate in the amount of 0.5 wt. % based on the solution and for changing the amount of 1,3-propanesultone (PS) into 2 wt. %, to prepare a nonaqueous electrolytic solution and a cylindrical battery of 18650 size. The 300 cycle charging-discharging test was carried out to determine battery performances. The results are shown in Table 1.

EXAMPLE 19

The procedures of Example 1 were repeated except for using 2-propynyl ethyl sulfite as an additive in place of 2-propynyl methyl carbonate in the amount of 0.5 wt. % based on the solution and for changing the amount of 1,3-propanesultone (PS) into 2 wt. %, to prepare a nonaqueous electrolytic solution and a cylindrical battery of 18650 size. The 300 cycle charging-discharging test was carried out to determine battery performances. The results are shown in Table 1.

COMPARISON EXAMPLE 1

The procedures of Example 1 were repeated except for not using 2-propynyl methyl carbonate and for using 1,3-propanesultone as an additive in the amount of 3 wt. % based on the solution, to prepare a nonaqueous electrolytic solution and a cylindrical battery of 18650 size. The 300 cycle charging-discharging test was carried out to determine battery performances. The results are shown in Table 1.

COMPARISON EXAMPLE 2

The procedures of Example 1 were repeated except for not using 2-propynyl methyl carbonate and for using 1,4-butanesultone (BS) as an additive in the amount of 3 wt. % based on the solution, to prepare a nonaqueous electrolytic solution and a cylindrical battery of 18650 size. The 300 cycle charging-discharging test was carried out to determine battery performances. The results are shown in Table 1.

COMPARISON EXAMPLE 3

The procedures of Example 1 were repeated except for not using 2-propynyl methyl carbonate and for using glycol sulfite as an additive in the amount of 3 wt. % based on the solution, to prepare a nonaqueous electrolytic solution and a cylindrical battery of 18650 size. The 300 cycle charging-discharging test was carried out to determine battery performances. The results are shown in Table 1.

COMPARISON EXAMPLE 4

The procedures of Example 1 were repeated except for not using 2-propynyl methyl carbonate and for using glycol sulfate as an additive in the amount of 3 wt. % based on the solution, to prepare a nonaqueous electrolytic solution and a cylindrical battery of 18650 size. The 300 cycle charging-discharging test was carried out to determine battery-performances. The results are shown in Table 1.

COMPARISON EXAMPLE 5

The procedures of Example 1 were repeated except for not using the sulfur-containing acid ester and for using 2-propynyl methyl carbonate as an additive in the amount of 3 wt. % based on the solution, to prepare a nonaqueous electrolytic solution and a cylindrical battery of 18650 size. The 300 cycle charging-discharging test was carried out to determine battery performances. The results are shown in Table 1.

COMPARISON EXAMPLE 6

The procedures of Example 1 were repeated except that the positive electrode composition was coated on aluminum foil, dried, pressed, and heated to give a positive electrode layer having the density of 3.1 g/a&, that the negative electrode composition was coated on copper foil, dried, pressed, and heated to give a negative electrode layer having the density of 1.1 $g/cm^3$, that 2-propynyl methyl carbonate was not used, and that 1,3-propanesultone was used as an additive in the amount of 3 wt. % based on the solution. In this way, a nonaqueous electrolytic solution and a cylindrical battery of 18650 size were produced. The produced battery was charged at a high temperature (60° C.) with a constant electric current (1.6 A, 1 C) to reach 4.2 V (terminal voltage), and was kept at 4.2 V. Total charging period was 3 hours. Subsequently, the battery was discharged to give a constant electric current (1.6 A, 1 C) to give a terminal voltage of 3.0 V. The charging-discharging cycle procedure was repeated for 300 cycles. The determined battery performances are shown in Table 1. The produced 18650 battery had smaller positive and negative electrode densities and also had smaller electric capacity than the battery of Comparison Example 1, and hence it hardly lost the electrolytic solution and its battery performances were less lowered.

COMPARISON EXAMPLE 7

The procedures of Comparison Example 6 were repeated except for not using 1,3-propanesultone and for using 2-propynyl methyl carbonate as an additive in the amount of 3 wt. % based on the solution, to prepare a nonaqueous electrolytic solution and a cylindrical battery of 18650 size. The 300 cycle charging-discharging test was carried out to determine battery performances. The results are shown in Table 1.

TABLE 1

| Example | Triple bond-cont. compound | Sulfur-cont. acid ester | Initial capacity (relative value) | Retention of discharge capacity(%) |
|---|---|---|---|---|
| 1 | 2-propynyl methyl carbonate (1 wt. %) | PS (3 wt. %) | 1.01 | 80.3 |
| 2 | 2-propynyl methanesulfonate (1 wt. %) | PS (3 wt. %) | 1.01 | 81.1 |
| 3 | 2-butyne-1,4-diol dimethyl carbonate (1 wt. %) | PS (3 wt. %) | 1.01 | 80.2 |
| 4 | 2-butyne-1,4-diol diformate (1 wt. %) | PS (3 wt. %) | 1.00 | 81.7 |
| 5 | 2-butyne-1,4-diol dimethanesulfonate (1 wt. %) | PS (3 wt. %) | 1.00 | 81.4 |
| 6 | 2,4-hexadiyne-1,6-diol dimethyl dicarbonate (1 wt. %) | PS (3 wt. %) | 1.00 | 80.3 |
| 7 | dipropargyl carbonate (1 wt. %) | PS (5 wt. %) | 1.00 | 80.5 |
| 8 | di(2-propynyl) sulfite (1 wt. %) | PS (3 wt. %) | 1.01 | 82.1 |
| 9 | di(2-propynyl) sulfate (1 wt. %) | PS (0.1 wt. %) | 1.01 | 81.8 |
| 10 | di(2-propynyl) oxalate (0.1 wt. %) | PS (3 wt. %) | 1.00 | 81.4 |
| 11 | di(2-propynyl) oxalate (1 wt. %) | PS (3 wt. %) | 1.01 | 82.5 |
| 12 | di(2-propynyl) oxalate (5 wt. %) | PS (3 wt. %) | 1.00 | 81.3 |
| 13 | di(1-metlayl-2-propynyl) oxalate (0.5 wt. %) | BS (3 wt. %) | 1.00 | 80.7 |
| 14 | phenylacetylene (0.1 wt. %) | PS (3 wt. %) | 1.00 | 80.1 |
| 15 | 2-butyne-1,4-diol diformate (1 wt. %) | GSI (1 wt. %) | 1.00 | 82.6 |
| 16 | 2-butyne-1,4-diol diformate (1 wt. %) | GSA (1 wt. %) | 1.00 | 82.4 |
| 17 | di(2-propynyl) oxalate (0.5 wt. %) | PS (3 wt. %) | 0.87 | 80.5 |
| 18 | 2-propynyl methyl sulfite (0.5 wt. %) | PS (2 wt. %) | 1.01 | 82.3 |
| 19 | 2-propynyl ethyl sulfite (0.5 wt. %) | PS (2 wt. %) | 1.01 | 82.2 |
| Com. 1 | — | PS (3 wt. %) | 1.00 | 64.1 |
| Com. 2 | — | BS (3 wt. %) | 1.00 | 62.7 |
| Com.3 | — | GSI (1 wt. %) | 0.99 | 64.4 |
| Com. 4 | — | GSA (1 wt. %) | 1.00 | 63.2 |
| Com. 5 | 2-propynyl methyl carbonate (3 wt. %) | — | 1.00 | 65.4 |
| Com. 6 | — | PS (3 wt. %) | 0.74 | 82.0 |
| Com. 7 | 2-propynyl methyl carbonate (3 wt. %) | — | 0.74 | 81.1 |

Remarks:
1: In Example 17, the positive electrode comprised LiMn$_2$O$_4$.
2: In Comparison Examples 6 and 7, the densities of both positive and negative electrode composition layers were lower than those in other examples.

EXAMPLE 20

A nonaqueous solvent of EC:MEC (=30:70, volume ratio) was prepared. In the nonaqueous solvent, LiPF$_6$ and Li (SO$_2$CF$_3$)$_2$ were dissolved in the amounts of 0.9 M and 0.1 M, respectively, to give a nonaqueous electrolytic solution. To the nonaqueous electrolytic solution was further added 2 wt. % of cyclohexybenzene (CHB). Further, di(2-propynyl) oxalate and 1,3-propanesultone (PS) were incorporated as additives in amounts of 0.3 wt. % and 2 wt. %, respectively.

[Manufacture of Lithium Secondary Battery and Measurement of its Battery Performances]

LiCoO$_2$ (positive electrode active material, 94 wt. %), graphite (electroconductive material, 3 wt. %) ad poly(vinylidene fluoride) (binder, 3 wt. %) were mixed. To the resulting mixture was further added 1-methyl-2-pyrrolidone. Thus produced mixture was coated on aluminum foil, dried, pressed, and heated to give a positive electrode. On the other hand, artificial-graphite (negative electrode active material, 95 wt. %) having a graphite crystal structure in which the lattice distance of lattice face (002), namely, don, was 0.335 nm and poly(vinylidene fluoride) (binder, 5 wt. %) were mixed. To the resulting mixture was further added 1-methyl-2-pyrrolidone. Thus produced mixture was coated on copper foil, dried, pressed, and heated to give a negative electrode. The positive and negative electrodes, a micro-porous polyethylene film separator (thickness: 20 μm), and the above-mentioned non-aqueous electrolytic solution were encased in a battery. The container was then filled with carbon dioxide having a dew point of −60° C., and sealed to produce a cylindrical battery of 18650 size (diameter: 18 mm, height: 65 mm). On the produced battery, a safety valve and an internal current breaker (PTC element) were provided. The densities of the positive and negative electrodes were 3.5 g/cm$^3$ and 1.6 g/cm$^3$, respectively. The thickness of the positive electrode layer (on one surface of the collector) was 65 μm, and that of the negative electrode layer (on one surface of the collector) was 70 μm.

The produced battery was charged at a high temperature (60° C.) with a constant electric current (2.2 A, 1 C) to reach 4.2 V (terminal voltage), and was kept at 4.2 V. Total charging period was 3 hours. Subsequently, the battery was discharged to give a constant electric current (2.2 A, 1 C) to give a terminal voltage of 3.0 V. The charging-discharging cycle procedure was repeated for 300 cycles. The initial charge-discharge capacity (mAh) was almost the same as the capacity measured in a battery using an 1M LiPF$_6$ and EC/PC/MEC (30/5/65, volume ratio) solvent mixture containing 3 wt. % of 1,3-propanesultone and no triple bond-containing compound [Comparison Example 1]. After 5-cycle charging-discharging test was completed, the fully charged 18650 battery giving 4.2 V was further charged at room temperature (25° C.) with a constant electric current (2.2 A, 1 C) and thereby test for overcharging was performed. In the overcharge test, the safety for overcharging was judged by whether the battery surface was heated to a temperature higher than 120-C or not. As the result, it was confirmed that the surface temperature of the overcharged battery was not higher than 120° C. The determined battery performances are shown in Table 2.

EXAMPLE 21

The procedures of Example 1 were repeated except that a nonaqueous solvent of EC:MEC (=30:70, volume ratio) was prepared, that $LiPF_6$ was dissolved in the non-aqueous electrolytic solution in the amount of 1 M, that 0.5 wt. % of biphenyl (BP) and 2 wt. % of cyclohexylbenzene (CHB) were further added, and that di(2-propynyl) oxalate and 1,3-propanesultone (PS) were added as additives in the amounts of 0.3 wt. % and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

EXAMPLE 22

The procedures of Example 1 were repeated except that a nonaqueous solvent of EC:MEC (=30:70, volume ratio) was prepared, that $LiPF_6$ was dissolved in the non-aqueous electrolytic solution in the amount of 1 M, that 0.5 wt. % of biphenyl (BP) and 2 wt. % of cyclohexylbenzene (CHB) were further added, and that di(2-propynyl) oxalate and 1,3-propanesultone (PS) were added as additives in the amounts of 0.3 wt. % and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

EXAMPLE 23

The procedures of Example 1 were repeated except that a nonaqueous solvent of EC:MEC (=30:70, volume ratio) was prepared, that $LiPF_6$ was dissolved in the non-aqueous electrolytic solution in the amount of 1 M, that 1 wt. % of t-amylbenzene (TAB) and 1 wt. % of cyclohexylbenzene (CHB) were further added, and that di(2-propynyl) oxalate and 1,3-propanesultone (PS) were added as additives in the amounts of 0.3 wt. % and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

EXAMPLE 24

The procedures of Example 1 were repeated except that a nonaqueous solvent of EC:MEC (=30:70, volume ratio) was prepared, that $LiPF_6$ was dissolved in the non-aqueous electrolytic solution in the amount of 1 M, that 4 wt. % of fluorobenzene (FB) and 1 wt. % of cyclohexylbenzene (CHB) were further added, and that di(2-propynyl) oxalate and 1,3-propanesultone (PS) were added as additives in the amounts of 0.3 wt. % and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

EXAMPLE 25

The procedures of Example 1 were repeated except that a nonaqueous solvent of EC:MEC (=30:70, volume ratio) was prepared, that $LiPF_6$ was dissolved in the non-aqueous electrolytic solution in the amount of 1 M, that 4 wt. % of fluorobenzene (FE) and 1 wt. % of 1-fluoro-4-cyclohexylbenzene (FCHB) were further added, and that di(2-propynyl) oxalate and glycolsulfite (GSI) were added as additives in the amounts of 0.3 wt. % and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

EXAMPLE 26

The procedures of Example 1 were repeated except that a nonaqueous solvent of EC:MEC (=30:70, volume ratio) was prepared, that $LiPF_6$ was dissolved in the non-aqueous electrolytic solution in the amount of 1 M, that 1 wt. % of 2,4-difluoroanisole (DFA) and 1.5 wt. % of cyclohexylbenzene (CHB) were further added, and that di(2-propynyl) oxalate and glycolsulfite were added as additives in the amounts of 0.3 wt. % and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

EXAMPLE 27

The procedures of Example 1 were repeated except that a nonaqueous solvent of EC:MEC (=30:70, volume ratio) was prepared, that $LiPF_6$ was dissolved in the nonaqueous electrolytic solution in the amount of 1 M, that 1 wt. % of cyclohexylbenzene (CHB) and 2 wt. % of 1-fluoro-4-cyclohexylbenzene (FCHB) were further added, and that 2-propynyl formate and 1,4-butanediol dimethanesulfonate (BDM) were added as additives in the amounts of 0.5 wt. % and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

EXAMPLE 28

The procedures of Example 1 were repeated except that a nonaqueous solvent of EC:MEC (=30:70, volume ratio) was prepared, that $LiPF_6$ was dissolved in the non-aqueous electrolytic solution in the amount of 1 M, that 1 wt. % of cyclohexylbenzene (CHB) and 3 wt. % of 1-fluoro-4-cyclohexyl-benzene (FCHB) were further added, and that 2-butyne-1,4-diol diformate and 1,3-propanesultone (PS) were added as additives in the amounts of 0.5 wt. %- and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

EXAMPLE 29

The procedures of Example 1 were repeated except that a nonaqueous solvent of EC:MEC (=30:70, volume ratio) was prepared, that LiPF$_6$ was dissolved in the non-aqueous electrolytic solution in the amount of 1 M, that 1 wt. % of t-amyl-benzene (TAB) and 3 wt. % of 1-fluoro-4-cyclohexylbenzene (FCHB) were further added and that di(2-propynyl) oxalate, di(2-propynyl) sulfite and 1,3-propanesultone (PS) were added as additives in the amounts of 0.3 wt. %, 0.3 wt. % and 2 wt. %, respectively. In this way, a nonaqueous electrolytic solution and a cylindrical battery of 18650 size were produced. The 300 cycle charging-discharging test was carried out to determine battery performances. The results are shown in Table 2. Further, in the overcharge test, it was confirmed that the surface temperature of the battery was not higher than 120° C.

TABLE 2

| Ex. | Triple bond-cont. compound | sulfur-cont. acid ester | Addtives | Initial capacity (relative value) | Retention of discharge capacity (%) |
|---|---|---|---|---|---|
| 20 | di(2-propynyl) oxalate (0.3 wt. %) | PS (2 wt. %) | CHB (2 wt. %) | 1.01 | 82.3 |
| 21 | di(2-propynyl) oxalate (0.3 wt. %) | PS (2 wt. %) | BP (0.5 wt. %) CHB (2 wt. %) | 1.01 | 81.5 |
| 22 | di(2-propynyl) oxalate (0.3 wt. %) | PS (2 wt. %) | TBB (1 wt. %) CHB (1 wt. %) | 1.01 | 82.1 |
| 23 | di(2-propynyl) oxalate (0.3 wt. %) | PS (2 wt. %) | TAB (1 wt. %) CHB (1 wt. %) | 1.01 | 81.4 |
| 24 | di(2-propynyl) oxalate (0.3 wt. %) | PS (2 wt. %) | CHB (1 wt. %) FB (4 wt. %) | 1.01 | 80.7 |
| 25 | di(2-propynyl) oxalate (0.3 wt. %) | GSI (1 wt. %) | FCHB (1 wt. %) FB (4 wt. %) | 1.01 | 82.5 |
| 26 | di(2-propynyl) oxalate (0.3 wt. %) | GSA (1 wt. %) | DFA (1 wt. %) CHB (1.5 wt. %) | 1.01 | 81.9 |
| 27 | 2-propynyl formate (0.5 wt. %) | BDM (2 wt. %) | CHB (1 wt. %) FCHB (2 wt. %) | 1.01 | 82.6 |
| 28 | 2-butyne-1,4-diol-formate (0.5 wt. %) | PS (2 wt. %) | CHB (1 wt. %) FCHB (3 wt. %) | 1.01 | 81.4 |
| 29 | di(2-propynyl) oxalate (0.3 wt. %) di(2-propynyl) sulfite (0.3 wt. %) | PS (2 wt. %) | TAB (1 wt. %) FCHB (3 wt. %) | 1.01 | 81.5 |

Remarks:
The electrolytic salt in Example 20 was 0.9 M of LiPF$_6$ + 0.1 M of LiN(SO$_2$CF$_3$)$_2$ while that in other Examples was 1 M of LiPF$_6$.

What is claimed is:

1. A nonaqueous electrolytic solution for a lithium secondary battery, comprising an electrolytic salt dissolved in a nonaqueous solvent, which contains 0.01 to 10 wt. % of a sulfur-containing acid ester and 0.01 to 10 wt. % of a triple bond-containing compound, said sulfur-containing acid ester being selected from the group consisting of 1,3-propane sultone, 1,3-butane sultone, glycol sulfite, propylene sulfite, glycol sulfate, propylene sulfate, 1,3-propanediol dimethanesulfonate and 1,4-butanediol dimethanesulfonate, and said triple bond-containing compound being represented by one of the following formulas (I) to (VI):

(I)

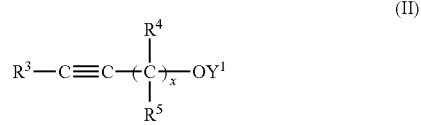

(II)

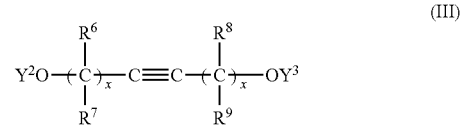

(III)

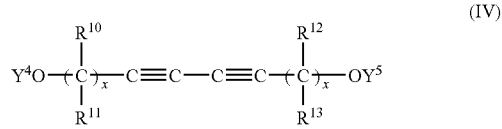

(IV)

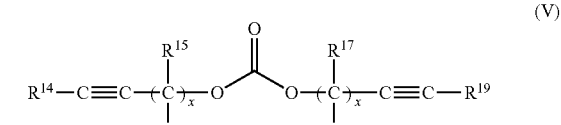

(V)

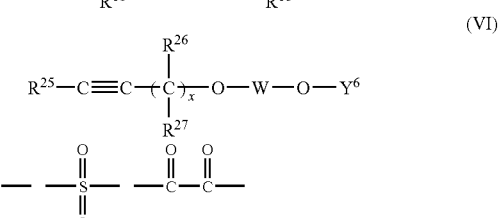

(VI)

in which $R^1$ is an alkyl group having 1 to 12 carbon atoms, a cycloalkyl group having 3 to 6 carbon atoms or an aryl group; $R^2$ is an alkyl group having 1 to 12 carbon atoms, a cycloalkyl group having 3 to 6 carbon atoms, an aryl group or hydrogen; p is an integer of 1 or 2; each of $R^3$ to $R^{19}$ is independently an alkyl group having 1 to 12 carbon atoms, a cycloalkyl group having 3 to 6 carbon atoms, an aryl group or hydrogen, provided that each set of $R^4$ and $R^5$, $R^6$ and $R^7$, $R^8$ and $R^9$, $R^{10}$ and $R^{11}$, $R^{12}$ and $R^{13}$, $R^{15}$ and $R^{16}$, and $R^{17}$ and $R^{18}$ may combine with each other to form a cycloalkyl group having 3 to 6 carbon atoms; $Y^1$ is —$COOR^{20}$, —$COR^{20}$ or —$SO_2R^{20}$; $Y^2$ is —$COOR^{21}$, —$COR^{21}$ or —$SO_2R^{21}$; $Y^3$ is —$COOR^{22}$, —$COR^{22}$ or —$SO_2R^{22}$; $Y^4$ is —$COOR^{23}$, —$COR^{23}$ or —$SO_2R^{23}$; $Y^5$ is —$COOR^{24}$, —$COR^{24}$ or —$SO_2R^{24}$; each of $R^{20}$, $R^{21}$, $R^{22}$, $R^{23}$ and $R^{24}$ is independently an alkyl group having 1 to 12 carbon atoms, a cycloalkyl group having 3 to 6 carbon atoms or an aryl group; each of $R^{25}$, $R^{26}$ and $R^{27}$ is independently an alkyl group having 1 to 12 carbon atoms, a cycloalkyl group having 3 to 6 carbon atoms, an aryl group having 6 to 12 carbon atoms, an aralkyl group having 7 to 12 carbon atoms or hydrogen, provided that $R^{26}$ and $R^{27}$ may combine with each other to form a cycloalkyl group having 3 to 6 carbon atoms; W is sulfoxide, sulfone or oxalyl; $Y^6$ is an alkyl group having 1 to 12 carbon atoms, an alkenyl group, an alkynyl group, a cycloalkyl group having 3 to 6 carbon atoms, an aryl group having 6 to 12 carbon atoms or an aralkyl group having 7 to 12 carbon atoms; and x is an integer of 1 or 2.

2. A lithium secondary battery comprising a positive electrode, a negative electrode and a nonaqueous electrolytic solution, wherein the electrolytic solution is that defined in claim 1.

3. The lithium secondary battery of claim 2, wherein the positive electrode comprises a positive electrode composite layer formed on aluminum foil, and the positive electrode composite layer has a density in the range of 3.2 to 4.0 g/cm$^3$.

4. The lithium secondary battery of claim 2, wherein the negative electrode comprises a negative electrode composite layer formed on copper foil, and the negative electrode composite layer has a density in the range of 1.3 to 2.0 g/cm$^3$.

5. The lithium secondary battery of claim 2, wherein the positive electrode comprises a material containing lithium compound oxide.

6. The lithium secondary battery of claim 2, wherein the negative electrode comprises a material containing one selected from the group consisting of lithium metal, lithium alloys, carbonaceous materials, tin metal, tin compounds, silicon, and silicon compounds.

7. The lithium secondary battery of claim 6, wherein the negative electrode is made of a carbonaceous material selected from the group consisting of pyrolytic carbonaceous materials, cokes, graphites, fired products of organic polymer compounds, and carbon fiber.

8. The lithium secondary battery of claim 2, wherein the negative electrode comprises graphite having a graphite crystal structure in which the lattice distance ($d_{002}$) of lattice face (002) is 0.340 nm or less.

\* \* \* \* \*

UNITED STATES PATENT AND TRADEMARK OFFICE
CERTIFICATE OF CORRECTION

| | | |
|---|---|---|
| PATENT NO. | : 7,629,085 B2 | Page 1 of 1 |
| APPLICATION NO. | : 11/597652 | |
| DATED | : December 8, 2009 | |
| INVENTOR(S) | : Abe et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 99 days.

Signed and Sealed this

Twenty-first Day of December, 2010

David J. Kappos
*Director of the United States Patent and Trademark Office*